UNITED STATES PATENT OFFICE.

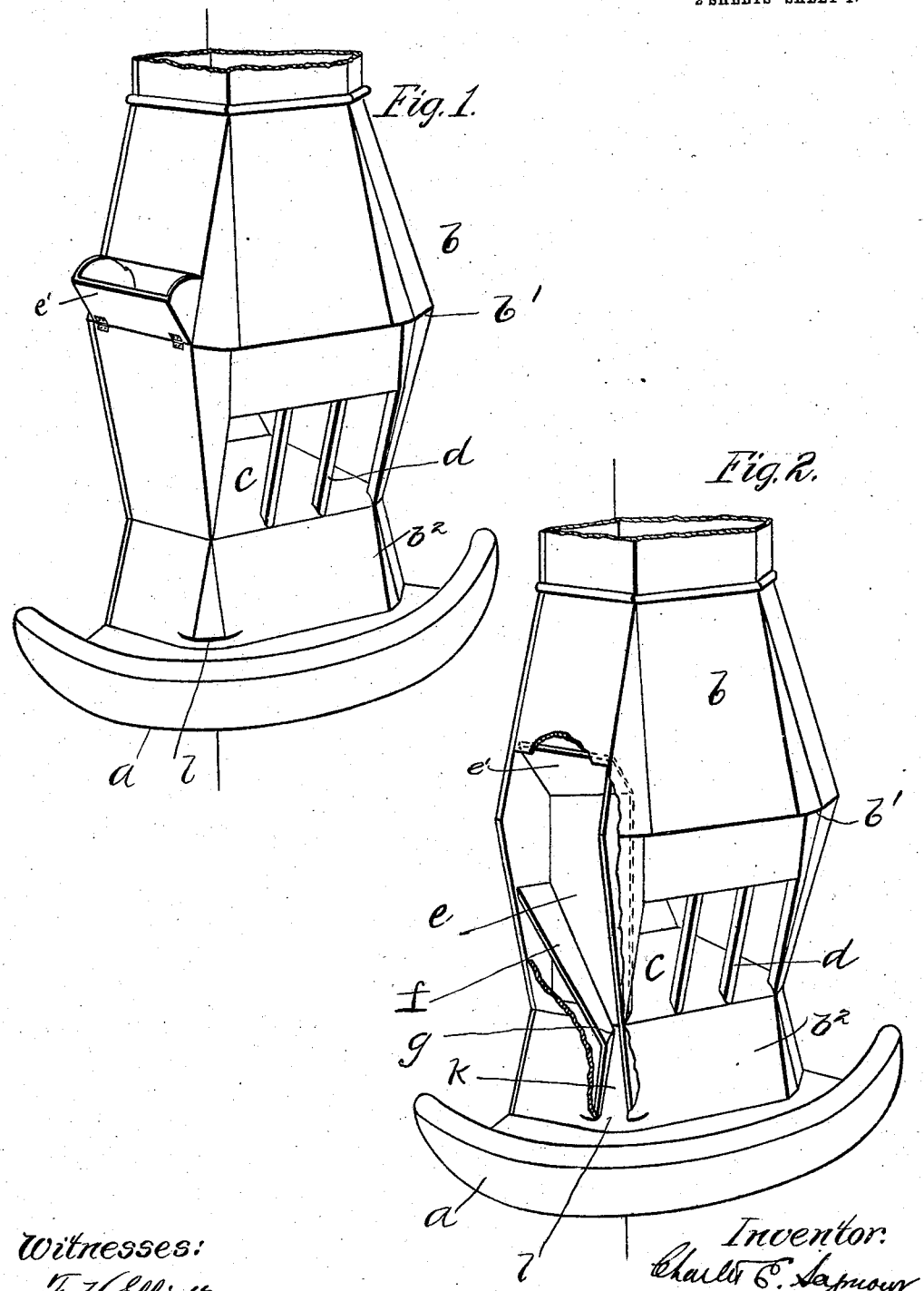

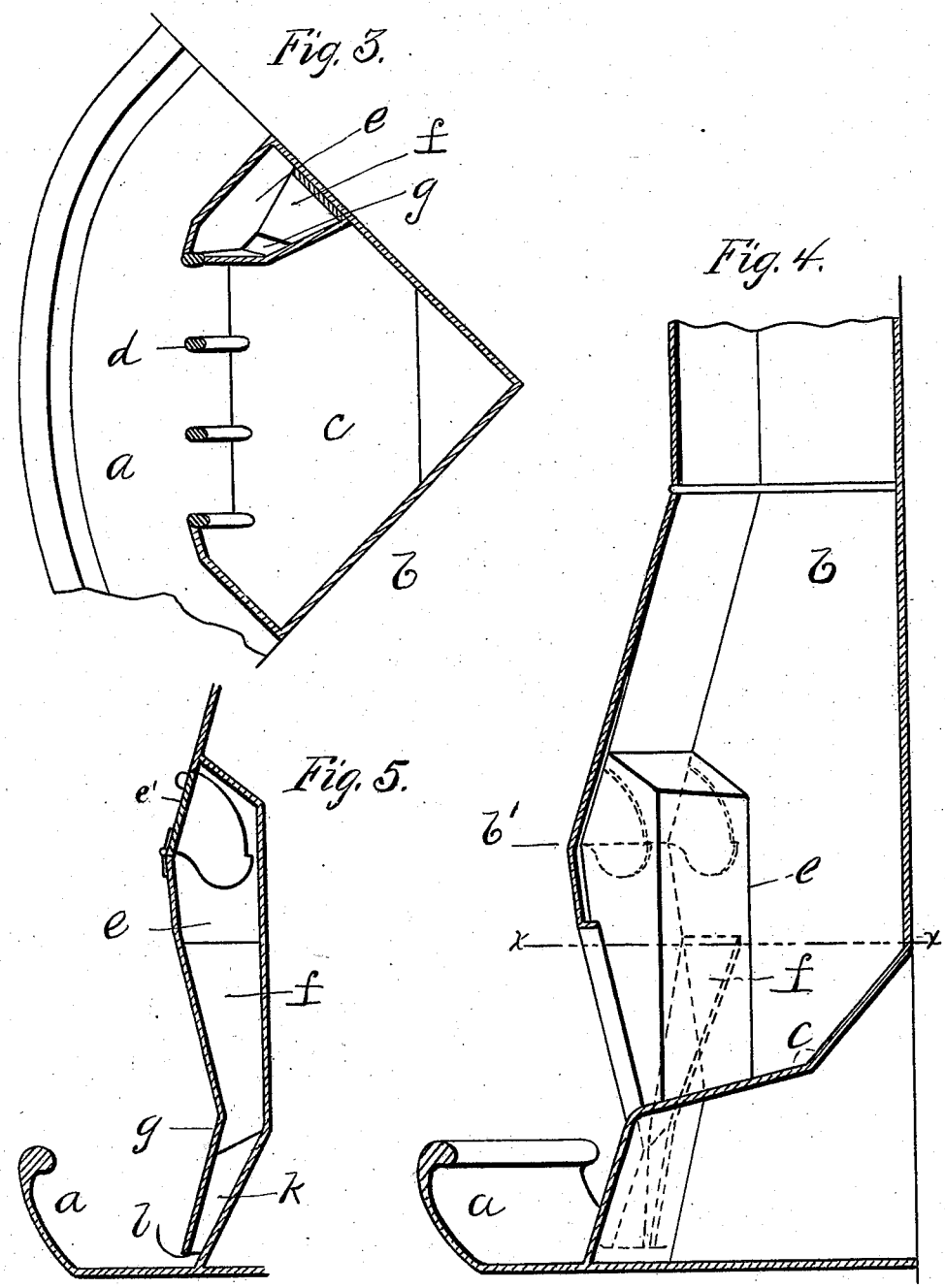

CHARLES E. SEYMOUR, OF WINSTED, CONNECTICUT.

SLOW-FEEDING DEVICE FOR HORSES.

No. 854,850.　　　Specification of Letters Patent.　　　Patented May 28, 1907.

Application filed August 14, 1906. Serial No. 330,558.

*To all whom it may concern:*

Be it known that I, CHARLES E. SEYMOUR, a citizen of the United States of America, residing at Winsted, in the county of Litchfield and State of Connecticut, have invented certain new and useful Improvements in Slow-Feeding Devices for Horses, of which the following is a specification.

The object of my invention is to provide a slow feeding device which is simple, compact, and has features of novelty and advantage.

In the drawings: Figure 1 is a perspective view of the device forming my invention. Fig. 2 is a similar view a part broken away to show the construction of the oat bin. Fig. 3 is a sectional view on the line $x$—$x$ of Fig. 4. Fig. 4 is a vertical sectional view. Fig. 5 is a detail sectional view of the oat bin.

Referring to the drawings $a$ denotes a manger which supports my slow feeding device and acts as a receptacle for the feed in the usual manner.

My device is of suitable shape, as shown in Fig. 1, to fit into the corner of a stall to allow a horse to feed conveniently.

The hay chamber $b$ is laterally enlarged at its central portion as at $b'$ which allows the hay as it is put in at the top to fall onto an inclined slide $c$ which forces the hay against the bars $d$ where the horses can get at it and feed on small portions at a time. The hay chamber is provided with an outwardly flaring base-piece $b^2$ and the whole is supported in the manger as clearly shown; this flaring base-piece prevents the horse while eating from getting its head under the hay chamber. In one side of said hay chamber I arrange an oat bin comprising a chamber $e$ contracted at its bottom, and within which is the inclining slide $f$ terminating at a contracted slot-like passage $g$. From this passage a flaring chute $k$ extends downwardly terminating in a long narrow outlet $l$ which is preferably arranged crosswise of the passage $g$. As will be readily seen the chute is at an angle to the slide, and the grain to get into the chute must pass through the contracted passage. The relative arrangement of the chute and slide is such that grain cannot clog; and after a small quantity of grain has run out into the manger the chute becomes filled up to the contracted passage and the bulk of the grain is held back in the bin. The oat bin may be filled full and yet a small heap of grain at the opening will hold back the grain until the heap is removed, whereupon the grain will run freely again into the manger $a$.

The oat bin is provided with a cover $e'$ hinged to the upper edge thereof and having side flanges which close the openings between the edges of the door and the oat bin when the cover is open.

By the above arrangement of my slow feeding device there is insured a slow delivery of feed and freedom from clogging.

I claim as my invention:

A feed box having diverging sides terminating in a contracted outlet, a discharge chute leading from said outlet and corresponding therewith at its intake end and with two of its walls diverging and two of its walls converging and terminating in a narrow elongated outlet, and a receiver with its bottom contiguous to the outlet of said chute, whereby a small quantity only of material will flow from the feed box and the discharge be retarded.

In testimony whereof I affix my signature in presence of two witnesses.

CHAS. E. SEYMOUR.

Witnesses:
H. LLOYD HOLCOMB,
J. ALBERT SMITH.